United States Patent
Zhang et al.

(10) Patent No.: US 11,894,009 B2
(45) Date of Patent: Feb. 6, 2024

(54) AUDIO PROCESSING METHOD, AUDIO PROCESSING APPARATUS AND COMPUTER STORAGE MEDIUM

(71) Applicant: Beijing Xiaomi Mobile Software Co., Ltd., Beijing (CN)

(72) Inventors: Liujun Zhang, Beijing (CN); Yuqing Hua, Beijing (CN); Zhen Yang, Beijing (CN); Zuojing Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 58 days.

(21) Appl. No.: 17/587,243

(22) Filed: Jan. 28, 2022

(65) Prior Publication Data
US 2023/0031101 A1 Feb. 2, 2023

(30) Foreign Application Priority Data
Jul. 30, 2021 (CN) .......................... 202110874251.2

(51) Int. Cl.
| G10L 21/003 | (2013.01) |
| G10L 21/007 | (2013.01) |
| G10L 21/057 | (2013.01) |
| G10L 21/013 | (2013.01) |

(52) U.S. Cl.
CPC .......... *G10L 21/007* (2013.01); *G10L 21/057* (2013.01); *G10L 2021/0135* (2013.01)

(58) Field of Classification Search
CPC ..... G10L 21/003; G10L 21/007; G10L 21/00; G10L 21/01; G10L 21/013; G10L 21/0332; G10L 21/034; G10L 13/033; G10L 13/0335

USPC ................. 704/278, 266, 270, 272
See application file for complete search history.

(56) References Cited

U.S. PATENT DOCUMENTS

| 2004/0215451 A1* | 10/2004 | Macleod ................ G10L 21/00 704/E21.001 |
| 2009/0051825 A1* | 2/2009 | Asayama ................. H04R 3/12 348/E5.122 |
| 2015/0302866 A1* | 10/2015 | Sobol Shikler ........ G06Q 10/10 704/270 |
| 2019/0371337 A1* | 12/2019 | Bunker ................... G10L 15/30 |

FOREIGN PATENT DOCUMENTS

| CN | 112530447 A | 3/2021 |
| CN | 112700783 A | 4/2021 |
| CN | 113037918 A | 6/2021 |

OTHER PUBLICATIONS

Sai Tech Guru "Video: Poco x3 pubg voice changer game turbo feature must try indepth review", Sep. 24, 2020, pp. 1-2, Retrieved from the Internet : URL:https://www.youtube.com/watch?v=ZJc6z9LzjNQ [retrieved on Jun. 30, 2022] the whole document, Type-X.

(Continued)

*Primary Examiner* — Qi Han
(74) *Attorney, Agent, or Firm* — Volpe Koenig (57) ABSTRACT

An audio processing method applied to a first terminal is described, and includes: in response to receiving of audio data input by a user at the first terminal, and determination that a voice change function is turned on, determining change parameters; and based on the change parameters, performing change processing on the audio data.

15 Claims, 5 Drawing Sheets

(56) References Cited

OTHER PUBLICATIONS

Extended European Search Report dated Jul. 13, 2022 for European Patent Application No. 22153992.7.
Chinese Office Action dated Oct. 13, 2023 for Chinese Patent Application No. 2021108742512.

* cited by examiner

AUDIO PROCESSING METHOD, AUDIO PROCESSING APPARATUS AND COMPUTER STORAGE MEDIUM

CROSS-REFERENCE TO RELATED APPLICATIONS

The present application is based upon and claims priority to Chinese Application No. 202110874251.2, filed on Jul. 30, 2021, the content of which is incorporated herein by reference in its entirety.

BACKGROUND

With the booming development of cell phones, more and more applications can communicate with other terminals that also run applications based on Internet protocols in the running process. For example, in a gaming application, communication with users of other terminals is done through Voice over Internet Protocol (Voip) while combating with others in groups.

However, in actual applications, in some cases, users do not know each other when communicating with other terminals that also run the applications based on Internet protocols, so the calling voice needs to be changed to protect personal information.

SUMMARY

To overcome problems in the related art, the disclosure provides an audio processing method, an audio processing apparatus and a computer storage medium. According to a first aspect of examples of the disclosure, an audio processing method is provided, applied to a first terminal, and the audio processing method includes: in response to receiving of audio data input by a user at the first terminal, and determination that a voice change function is turned on, determining change parameters; and based on the change parameters, performing change processing on the audio data.

According to a second aspect of examples of the disclosure, an audio processing apparatus is provided, applied to a first terminal, the audio processing apparatus includes: a memory, used to store instructions; and a processor, used to call instructions stored in the memory to execute in response to receiving of audio data input by a user at the first terminal, and determination that a voice change function is turned on, determine change parameters; and based on the change parameters, perform change processing on the audio data.

According to a third aspect of examples of the disclosure, a non-temporary computer-readable storage medium is provided, storing instructions, the instructions are executed by a processor to in response to receiving of audio data input by a user at a first terminal, and determination that a voice change function is turned on, determine change parameters; and based on the change parameters, perform change processing on the audio data.

It shall be understood that the above general description and the following detailed description are exemplary and explanatory, and are not intended to limit the disclosure.

BRIEF DESCRIPTION OF THE FIGURES

The accompanying drawings herein are incorporated into the specification and constitute a part of the specification, show examples consistent with the disclosure, and are used to explain the principle of the disclosure together with the specification.

DETAILED DESCRIPTION

Examples will be described in detail here, and examples are shown in the drawings. When the following descriptions refer to the drawings, the same numbers in different drawings indicate the same or similar elements, unless otherwise indicated. The implementation manners described in the following examples do not represent all implementation manners consistent with the disclosure. Instead, they are merely examples of apparatuses and methods consistent with some aspects of the disclosure described as detailed in the appended claims.

In a related art, a terminal does not have voice change function, to protect personal privacy, when a user communicates with others in the process of running applications at the terminal, a third-party plug-in is needed to add a new virtual driver, and then the purpose of changing the call voice of the user is achieved. However, a relevant third-party plug-in is not operable when being installed or downloaded, affecting the installation experience of the user. In addition, since the third-party plug-in is downloaded by the user voluntarily, the third-party plug-in also has certain hidden problems with the adaptability to a terminal system, affecting the stability of change.

In view of this, the disclosure provides an audio processing method, including performing change processing on received audio data based on determined change parameters, that a user can achieve change without downloading a third-party plug-in, so that the use experience can be improved while personal privacy is protected, and in addition, change stability can be improved.

In an example, applications may include a game application. In another example, applications may also include a social application.

In an example, the audio processing method, provided by the present disclosure, can be applied to any terminal. In an example, terminals may include but not be limited to mobile terminals, such as: a cell phone, a tablet, a smart TV, a smart speaker with screen, a smart watch with screen, and Ipod®. In another example, structures of terminals may include: a double-sided screen terminal, a folding screen terminal, a full-screen terminal, etc.

Figure 1:
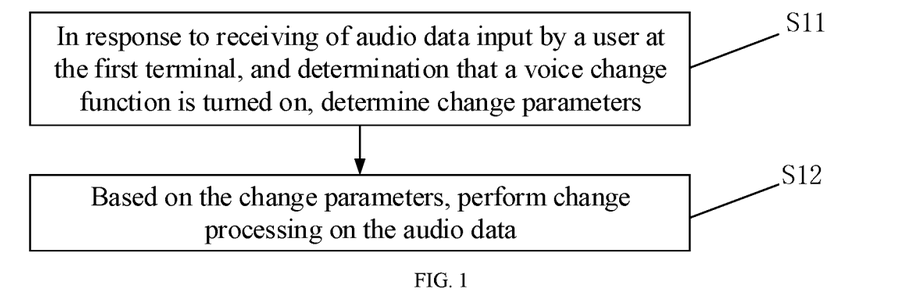
FIG. 1 shows a flowchart of an audio processing method illustrated according to an example.

FIG. 1 shows a flowchart of an audio processing method illustrated according to an example. As shown in FIG. 1, the audio processing method is used in a terminal, including the following steps S11 to S12.

In step S11, in response to receiving of audio data input by a user at the first terminal, and determination that the voice change function is turned on, determining change parameters.

In examples of the disclosure, when the first terminal receives the audio data input by the user, a determination that the user needs voice calling at the moment is made. When determining that a voice change function of an application is turned on, a determination that the user is in voice calling is made, and that the audio data input by the user needs change processing. When receiving the audio data input by the user, and determining that the voice change function of the application is turned on, that the user needs to perform change processing on input audio data can be determined, and then change parameters for performing change processing on the audio data can be determined. In an example, when determining that the change function is not turned on, it is determined by default that the user does not need to perform change processing on an input audio. In an example, the change parameters may be parameters corresponding to the change modes. For example, the change mode may include: a girl sound mode, an adult lady sound mode, an adult man sound mode, a robot sound mode or a cartoon sound mode. Change parameters corresponding to different change modes are different.

In an implementation, audio data input by the user may be received in the process of running the application at the first terminal. In the process of running the application, applications refer to those communicating with a second terminal that also runs the applications based on Internet protocols over the Internet, based on choices of the user. That is, the applications are applications capable of performing interconnected voice communication over Internet protocols. For example, applications may include: a game application or a social application.

In step S12, change processing is performed on audio data based on change parameters.

In examples of the disclosure, the first terminal performs change processing on change data input by a user based on determined change parameters. Performing change processing on audio data may be understood as a process of performing change processing on corresponding sound of currently input audio data according to change parameters of an appointed change mode, to change it into another sound. In an implementation, performing change processing on audio data may include performing change processing on original sound of the user. For example, the process of changing the original sound into an adult male sound. In another implementation, performing change processing on audio data may also include, after the original sound of the user has been subjected to change processing, performing change processing on audio data subjected to change processing according to choices of the user. For example, switching the adult man sound into a girl sound on the basis that the original sound is changed into the adult man sound.

With the examples, the first terminal can perform voice change processing on the input audio data according to the determined voice change parameters when the audio data input by the user are received and the voice change function of the application is turned on. In addition, when the audio data are subjected to voice change processing, voice change processing can be performed without downloading the third-party plug-in, then stable use of the voice change function is facilitated, the user does not need to worry about the problem that the change processing effect is affected by the voice change function being incompatible with the terminal system, and the use experience of the user can be improved.

In an implementation, the audio data subjected to change processing may be sent to the second terminal. The second terminal runs applications capable of performing interconnected voice communication over Internet protocols. For example, taking a mobile game application as an example, in combating with others in groups, different users use different terminals. To ensure that different users can communicate with each other when running the mobile game application at respective terminals, mutual communication can be performed based on Voip supported by the mobile game application.

In an example, to enable the application to perform change processing on the audio data input by the user when the user needs to communicate based on Voip in the process of running the application at the first terminal, the relationship between the voice change function and the application may be established in advance, to determine whether the application has the voice change function or not according to the relationship between the voice change function and the application. After determining that the application has the voice change function, the voice change parameters that need change processing can be determined based on the sequence between the time when the voice change function is turned on and the time when the voice path is created. The time when the voice change function is turned on can be understood as the time when the application is started to implement the voice change function. The time when the voice path is created can be understood as that the user turns on the voice calling function of the application to communicate with a user of the second terminal running the application based on Voip. By taking the game application as an example, the time when the voice path is created can be understood as the time when the user turns on the game application to implement a gang-up function. Gang-up is a game language referring to communication with users of the second terminal running the same application in a voice or face-to-face mode when the users are playing games.

In an example, if the time when the application turns on the voice change function is earlier than the time when the voice path is created, that the relationship between the voice change function and the application is established before the users communicate based on Voip is characterized, and then the voice change function is determined. When determining that the time when the voice change function is turned on is earlier than the time when the voice path is created, change parameters can be set in advance before the voice path is created, and then when the voice path is created, change processing can be performed based on the change parameters set in advance, so that the user can directly perform change processing on input audio data according to set parameters when communicating based on Voip, and the audio data input by the user are subjected to change protection from the beginning of communication.

In an implementation, by taking the game application as example, that the game application has the voice change function is determined in advance. Change parameters requiring change processing can be determined before gang-up of the users, then after the gang-up function is turned on, the voice path is created, and the received audio data input by the user are subjected to change processing according to the change parameters set in advance. For example, the change parameters set in advance are change parameters of the girl sound mode, then after the voice path is created, the received audio data input by the user are subjected to change processing according to the change parameters of the girl sound mode.

In another example, if the time when the voice change function is turned on is later than the time when the voice path is created, that the relationship between the voice change function and the application is established after the users communicate based on Voip is characterized. It can be understood that the relationship between the voice change function and the application is established when the users communicate based on Voip, and then the application has the voice change function. When determining that the time when the voice change function is turned on is later than the time when the voice path is created, the application traverses change parameters corresponding to each voice path in the change parameter library based on choices of the user, to obtain change parameters matching with the voice path, that is, obtain change parameters corresponding to a change mode appointed by the user, and then the users can call change parameters requiring change processing at any time when communicating based on Voip, so that the application experience can be improved, and user interest can be enhanced. The change parameter library can be understood as a set of multiple change parameters.

In an implementation, by taking the game application as example, in the gang-up process of the user, the relationship between the voice change function and the application is established, and then a change mode for change is selected. After the user selects the appointed change mode, the application traverses change parameters corresponding to each voice path in the change parameter library, and calls change parameters matching with the change mode appointed by the user for change, and then the change parameters obtained through matching are taken as change parameters for the voice path to perform change processing.

In another implementation scene, the change parameters may be determined by an AudioManager based on the first terminal. The AudioManager includes an AudioFlinger. AudioFlinger is used to control management of an input/output stream device and processing transmission of audio stream data, and in addition, AudioFlinger includes a RecordThread capable of creating the voice path. If the time when the application turns on the voice change function is earlier than the time when RecordThread is created, a change parameter (AudioFlinger::setParameters) in the voice path is created, and the change parameter (RecordThread) is stored. Then when the voice path is created, the determined change parameter is sent to the voice path. If the time when the voice change function is turned on is later than the time when the voice path is created, change parameters corresponding to each voice path in the change parameter library are directly traversed in AudioFlinger::setParameters, and according to the change parameters corresponding to the change mode appointed by the user, the change parameters for performing change processing, of the voice path, are matched, and the matched change parameters are sent to the voice path.

In another example, the voice path is set based on function options capable of setting the voice change function. The function options for setting the voice change function are turned on, and applications are added on a voice change function setting page corresponding to the function options, so that a corresponding relationship between the application and the voice change function is established, and then the application has the voice change function. Then when the application has the change function, change parameters for change processing are set up. In an example, the function options may be one function option set under terminal system settings. In another example, the function options may be a functional phone Application (APP) under software carried by the terminal system itself.

In an implementation, the function options may include a game booster function, there is a voice change function setting page for adding the application under the game booster function, and then by adding the application, the application has the voice change function for performing change processing on the input audio data.

In another implementation, the game booster function may be a function which can be executed by a game booster APP, where there is the voice change function setting page for adding the application in the game booster APP, and then by adding the application, the application has the voice change function for performing change processing on the input audio data.

Figure 2:
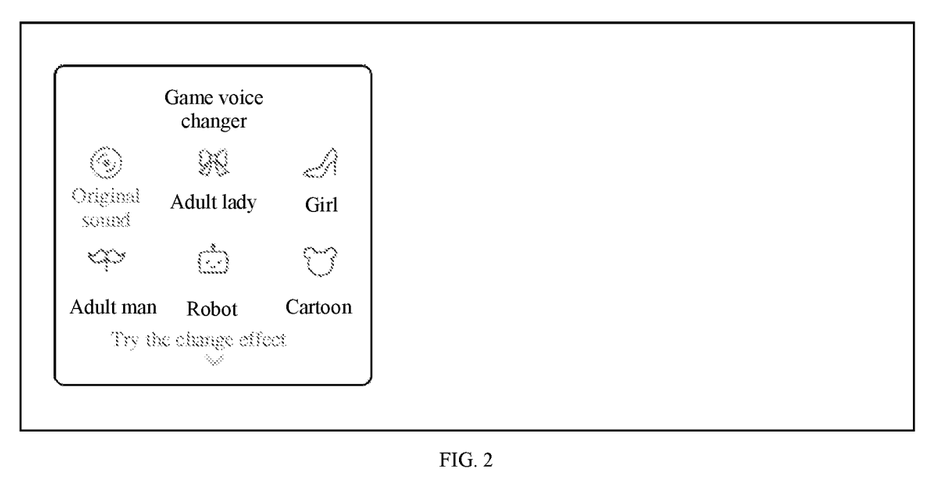
FIG. 2 shows a page effect schematic diagram illustrated according to an example.

In a third implementation, the game application is taken as example. When the corresponding relationship between the application and the voice change function is established through game booster, game booster can be searched in system settings of the first terminal, and then a corresponding application can be added by clicking a button at the right upper part (the position of the button can be defined by the user). When the change parameters are set up, a game application interface is opened, slide at the right upper corner (the position can be defined by the user) to turn on game booster, any change mode provided in a game voice changer is selected in the game booster, and then change parameters corresponding to the selected change mode are taken as change parameters for the application to perform change processing. While a game interface is opened, an interface for determining a change mode through the game booster may be shown in FIG. 2. FIG. 2 shows a page effect schematic diagram illustrated according to an example. The game voice changer can be understood as the voice change function setting function page, which is capable of providing multiple change modes, and in addition, different change modes correspond to different change parameters. The change mode in the game voice changer may include, for example: an original sound mode, a girl sound mode, an adult lady sound mode, an adult man sound mode, a robot sound mode or a cartoon sound mode, which is not limited by the disclosure. In an example, to facilitate user selection, the user may also try listening to the voice change effect through the game voice changer.

In an example, in the voice path, when performing change processing on the audio data based on the change parameters, determination can be done based on a current voice change function turn-on state and the application identification of the application currently running. The change parameters may include a voice change function turn-on parameter, an application identification and a change mode.

If the voice change function is not currently turned on, but the voice change function turn-on parameter characterizes that the voice change function is turned on and a change mode is set up, and that the application identification used by an application currently running is the same as the application identification of the change parameter, that the user does not need to communicate with a user of the second terminal running the application based on Voip at the moment is characterized, but the current application has the voice change function, and change parameters for performing change processing on audio data received from the voice path are set up. Then the function of performing change processing on the received audio data currently is turned on, and the received audio data are subjected to change processing. The application identification of the application currently running is the same as the application identification of the change parameters, that the application and the voice change function have the corresponding relationship is characterized, and the application is capable of performing change processing.

If the voice change function is currently turned on, but the change mode corresponding to the change parameter is not accordant with a change mode used by an application currently running, then the user needs to change the change parameter is characterized, and then an original change parameter is switched to a function of performing change processing on the received audio data in the change mode corresponding to the change parameter. For example, when the change mode corresponding to the parameter set in advance is the girl sound mode, and when the application currently running turns on the interconnected voice communication over Internet protocols, and the used change mode is the adult men sound mode, then the girl sound mode is switched into the adult man sound mode.

Figure 3:
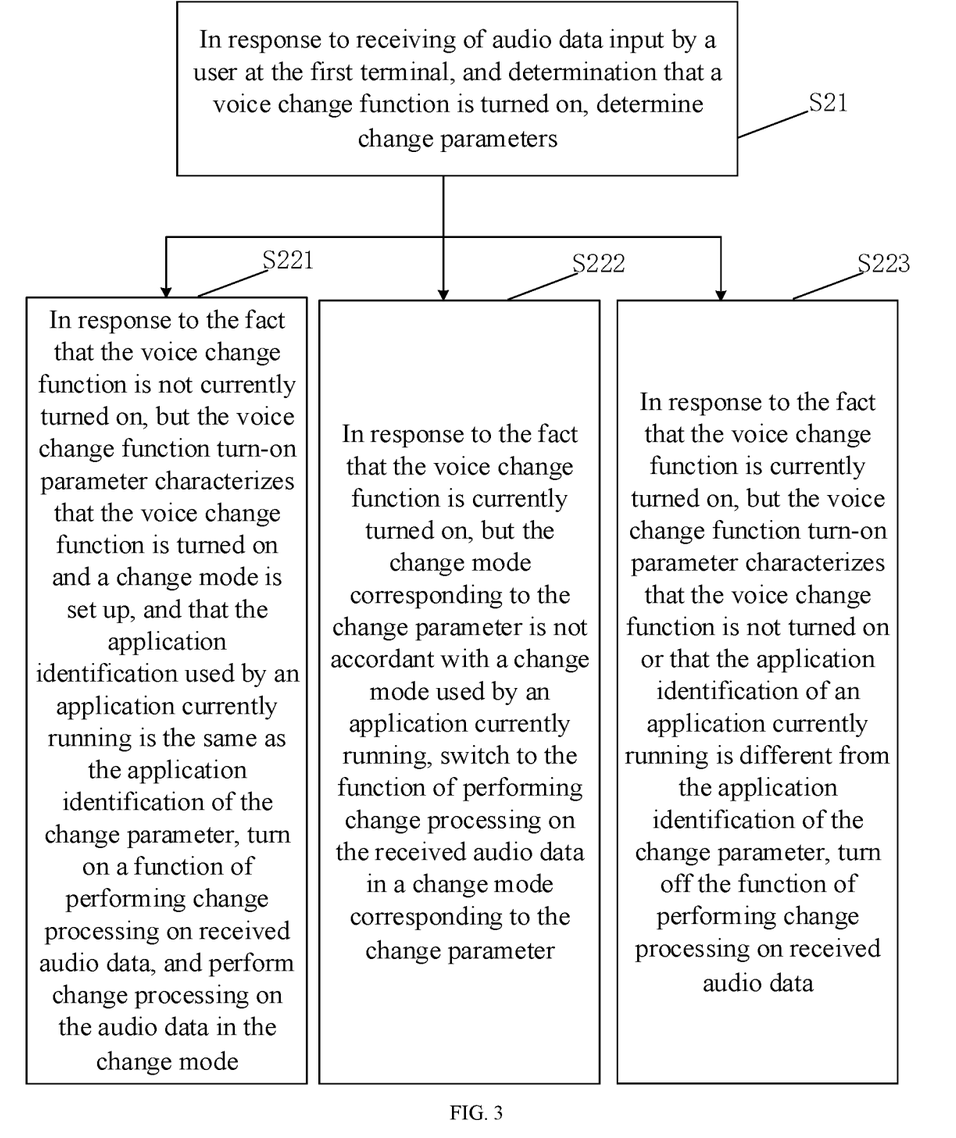
FIG. 3 shows a flowchart of a method for determining change parameters illustrated according to an example.

In another example, FIG. 3 shows a flowchart of a method for determining change parameters illustrated according to an example; As shown in FIG. 3, the method for determining the change parameters includes the following steps:

In step S21, in response to receiving of audio data input by a user at the first terminal, and determination that a voice change function is turned on, change parameters are determined.

In step S221, in response to the fact that the voice change function is not currently turned on, but the voice change function turn-on parameter characterizes that the voice change function is turned on and a change mode is set up, and that the application identification used by an application currently running is the same as the application identification of the change parameter, turning on a function of performing change processing on received audio data, and performing change processing on the audio data in the change mode.

In step S222, in response to the fact that the voice change function is currently turned on, but the change mode corresponding to the change parameter is not accordant with a change mode used by an application currently running, switching to the function of performing change processing on the received audio data in a change mode corresponding to the change parameter.

In step S223, in response to the fact that the voice change function is currently turned on, but the voice change function turn-on parameter characterizes that the voice change function is not turned on or that the application identification of an application currently running is different from the application identification of the change parameter, turning off the function of performing change processing on received audio data.

In the example of the disclosure, in response to the fact that the application currently running turns on the voice change function, but the voice change function turn-on parameter characterizes that the voice change function is not turned on or the application identification of the application currently running is different from the application identification of the change parameter, the fact that the user does not need change processing when communicating based on Voip, or that the application does not have the voice change function is characterized. When the application currently running turns on the interconnected voice communication over Internet protocols, the function of performing change processing on the received audio data is turned off.

Figure 4:
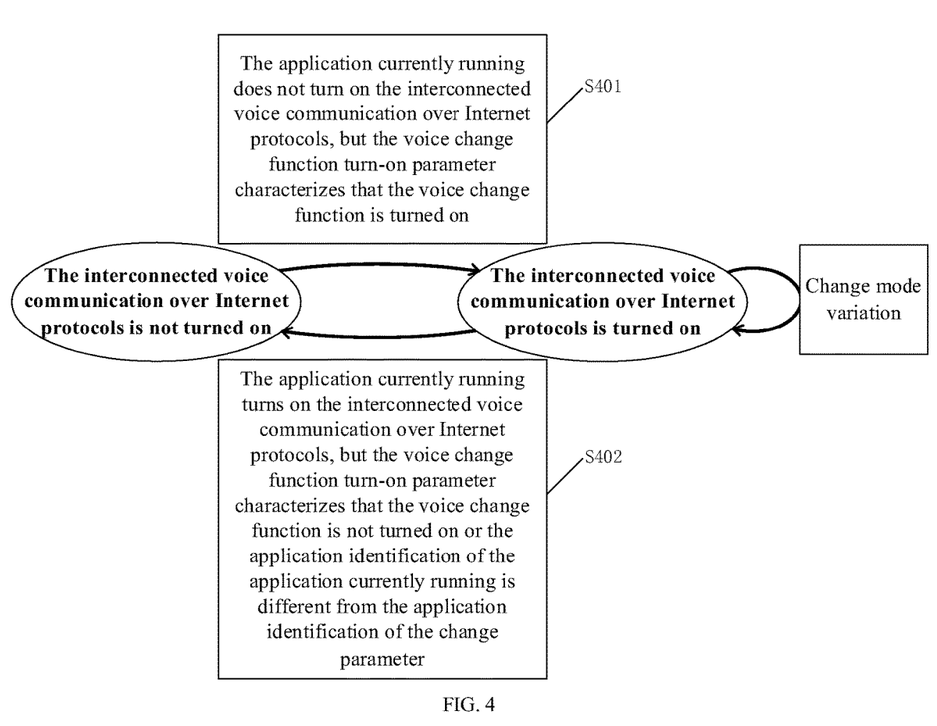
FIG. 4 shows a flowchart of a method for change processing judgment illustrated according to an example.

In an implementation, the process of determining whether to perform change processing on audio data may be as shown in FIG. 4. FIG. 4 shows a flowchart of a method for change processing judgment illustrated according to an example.

In step S401, if the application currently running does not turn on the interconnected voice communication over Internet protocols, but the voice change function turn-on parameter characterizes that the voice change function (ModeOpen=true && Mode>0 && isAPPVoip=true) is turned on, and the application identification (User Identification, uid) of the application currently running is the same as the application identification of the change parameter, the interconnected voice communication over Internet protocols of the application currently running is turned on.

If the application currently running turns on the interconnected voice communication over Internet protocols, but the change mode corresponding to the change parameter is not accordant with the change mode used by the application currently running, the change mode used by the application currently running is switched to the change mode corresponding to the change mode.

In step S402, if the application currently running turns on the interconnected voice communication over Internet protocols, but the voice change function turn-on parameter characterizes that the voice change function is not turned on or the application identification of the application currently running is different from the application identification of the change parameter (ModeOpen=false Or isAPPVoip=false), the interconnected voice communication over Internet protocols of the application currently running is turned off.

Figure 5:
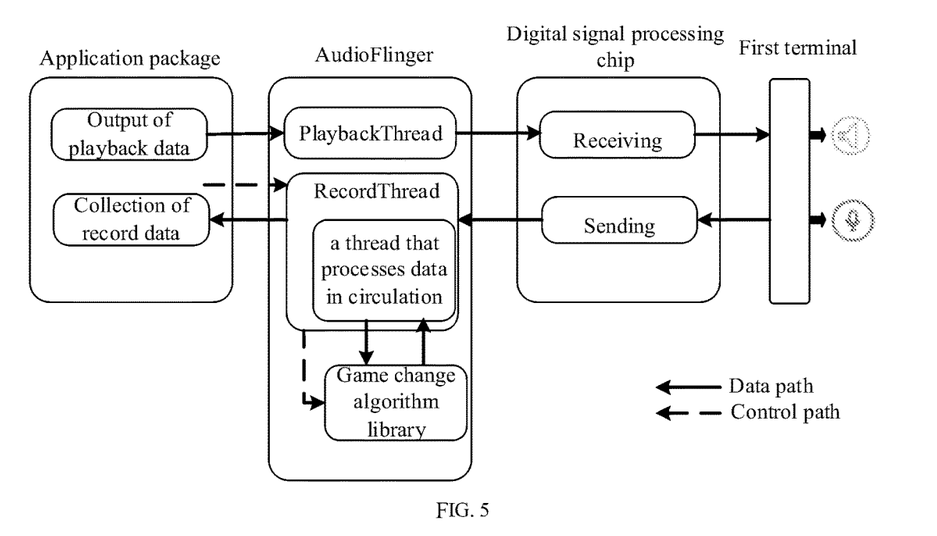
FIG. 5 shows a schematic diagram of an AudioManager illustrated according to an example.

In another implementation, the game application is taken as example. When the first terminal performs audio processing on the audio data, the change parameter may be determined based on a bottom layer, and then the audio data are subjected to change processing. As shown in FIG. 5, FIG. 5 shows a schematic diagram of an AudioManager illustrated according to an example. A solid arrow represents a data path, and a dotted arrow represents a control path. The AudioManager includes: an Android Application Package (APK), AudioFlinger, and Digital signal processing chip (ADSP). APK is an application package file format used by an Android operating system, used to distribute and install mobile applications and middleware. APK includes: AudioTrack, responsible for output of playback data, and AudioRecord, responsible for collection of record data. AudioFlinger includes: Playbackthread, and RecordThread. RecordThread includes a thread that ThreadLoop processes data in circulation, and a game change algorithm library. ADSP is a digital signal processing chip, including: TX sending, and RX receiving.

When the user uses the game application and needs to execute related operations of change, the game application is capable of setting change parameters for the bottom layer through AudioManager. The change parameters are analyzed by the bottom layer in AudioFlinger and the change parameters are set for the game change algorithm library. Audio data recorded by a microphone (mic) are transmitted to AudioFlinger through ADSP, RecordThread::ThreadLoop of AudioFlinger (a thread capable of processing audio data in loop in a voice path thread) copies the Pulse Code Modulation (PCM) data (an uncompressed audio sampling data nude stream) to each application (track) in a loop, and judges whether a current track needs to perform change processing or not after copying. If change processing is needed, the change parameters are transmitted to the game change algorithm library for change processing, and the processed audio data are transmitted to the game application to be sent to the second terminal.

Specifically, a use capability function of the voice change function is facilitated in the application. A macro switch is created in the bottom layer, and if the switch function is turned on, that the application has the voice change function is characterized. If the switch function is turned off, that the application does not have the voice change function is characterized.

When the change parameters are determined in AudioFlinger, if the time when the voice change function is turned on is later than the time when the voice path is created, change parameters corresponding to each voice path in the change parameter library are directly traversed in AudioFlinger::setParameters, to obtain change parameters matching with the voice path. If the time when the application turns on the voice change function is earlier than the time when the voice path is created, the change parameters set in advance are stored in AudioFlinger::setParameters, and then when the voice path is created, the set change parameters are sent to the game change algorithm library for change processing.

When the game change algorithm library receives the set change parameters, each change parameter for game change is analyzed by calling check For Game Parameter_1. If the change parameters vary, a setGameMode is called for processing, and all audiotracks (responsible for output of playback data) currently created are processed in setGameMode in loop.

If a current application does not turn on the interconnected voice communication over Internet protocols, but ModeOpen=true and Mode>0 are received in RecordThread, and uid of a current track is equal to a received uid, the change processing function of the current application is turned on. If the current application turns on the interconnected voice communication over Internet protocols, but ModeOpen=false is received in RecordThread or uid of the current track is not equal to the received uid, the change processing function of the current application is turned off. If the current application turns on the interconnected voice communication over Internet protocols, but a change mode received in RecordThread is not equal to a change mode of the current track, the change mode of the current track is switched.

When determining whether the application turns on the application change mode, and determining that the application turns on the application change mode and corresponding change parameters are set up, PCM is transmitted to each application in AudioFlinger::RecordThread::threadLoop, and corresponding change processing is performed when each application needs to perform change processing.

By adopting any of the audio processing methods, the voice change function can be developed based on a terminal system of the first terminal, and then the user can obtain a free and stable change function, and can communicate in different change modes based on Voip when using relevant applications, in addition, when the voice change function is turned off, the original sound of the user can be protected, and then the application experience interest is enhanced while personal privacy is protected.

The audio processing method provided by the disclosure can perform change processing on audio data input by a user based on determined change parameters without downloading third-party applications, achieving the purpose of protecting personal privacy while the use experience is enhanced.

Based on the same idea, examples of the disclosure further provide an audio processing apparatus applied to a first terminal.

It can be understood that the audio processing apparatus provided by examples of the disclosure contains corresponding hardware structures and/or software modules that perform respective functions to achieve the functions. In combination with units and algorithmic steps of each example disclosed in examples of the disclosure, examples of the disclosure can be implemented in the form of hardware or a combination of hardware and computer software. Whether a function is implemented in hardware or computer software-driven hardware depends on specific applications and design constraints of the technical solution. A person skilled in the art may use a different method for each particular application to achieve the functions, but such implementation shall not be considered outside the scope of the technical solution of the examples of the disclosure.

Figure 6:
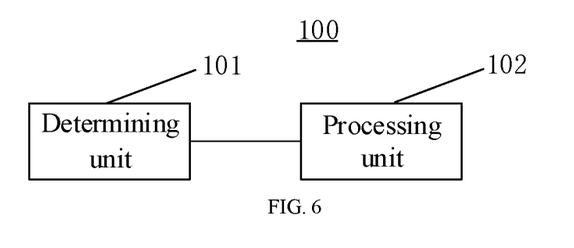
FIG. 6 shows a block diagram of an audio processing apparatus illustrated according to an example.

FIG. 6 shows a block diagram of an audio processing apparatus illustrated according to an example. Referring to FIG. 6, the audio processing apparatus 100 includes a determining unit 101 and a processing unit 102.

The determining unit 101 is used to determine change parameters in response to receiving of audio data input by a user at a first terminal, and determination that a voice change function is turned on.

The processing unit 102 is used to perform change processing on the audio data based on the change parameters.

In an example, the determining unit 101 determines change parameters in the following modes: in response to the fact that the time when the voice change function is turned on is earlier than the time when a voice path is created, determining change parameters set at the time when the voice path is created. Or in response to the fact that the time when the voice change function is turned on is later than the time when the voice path is created, traversing change parameters corresponding to each voice path in a change parameter library, to obtain change parameters matching with the voice path.

In another example, the voice path is created in the following modes: turning on function options for setting voice change functions, adding applications corresponding to the voice paths on a voice change function setting page corresponding to the function options, and setting change parameters.

In a third example, the change parameters include a voice change function turn-on parameter, an application identification and a change mode. The processing unit 102 performs change processing on the audio data based on the change parameters in the following modes: in response to the fact that the voice change function is not currently turned on, but the voice change function turn-on parameter characterizes that the voice change function is turned on and a change mode is set up, and that the application identification used by an application currently running is the same as the application identification of the change parameter, turning on a function of performing change processing on received audio data, and performing change processing on the audio data in the change mode. Or in response to the fact that the voice change function is currently turned on, but the change mode corresponding to the change parameter is not accordant with a change mode used by an application currently running, switching to the function of performing change processing on the received audio data in a change mode corresponding to the change parameter.

In a third example, the processing unit 102 is also used to: turn off the function of performing change processing on received audio data in response to the fact that the voice change function is currently turned on, but the voice change function turn-on parameter characterizes that the voice change function is not turned on or that the application identification of an application currently running is different from the application identification of the change parameter.

In a fourth example, the function options include a game booster function.

With regard to the apparatuses in the above examples, the specific manners that various modules perform operations have been described in detail in the examples relating to the methods, and details are not described herein.

Figure 7:
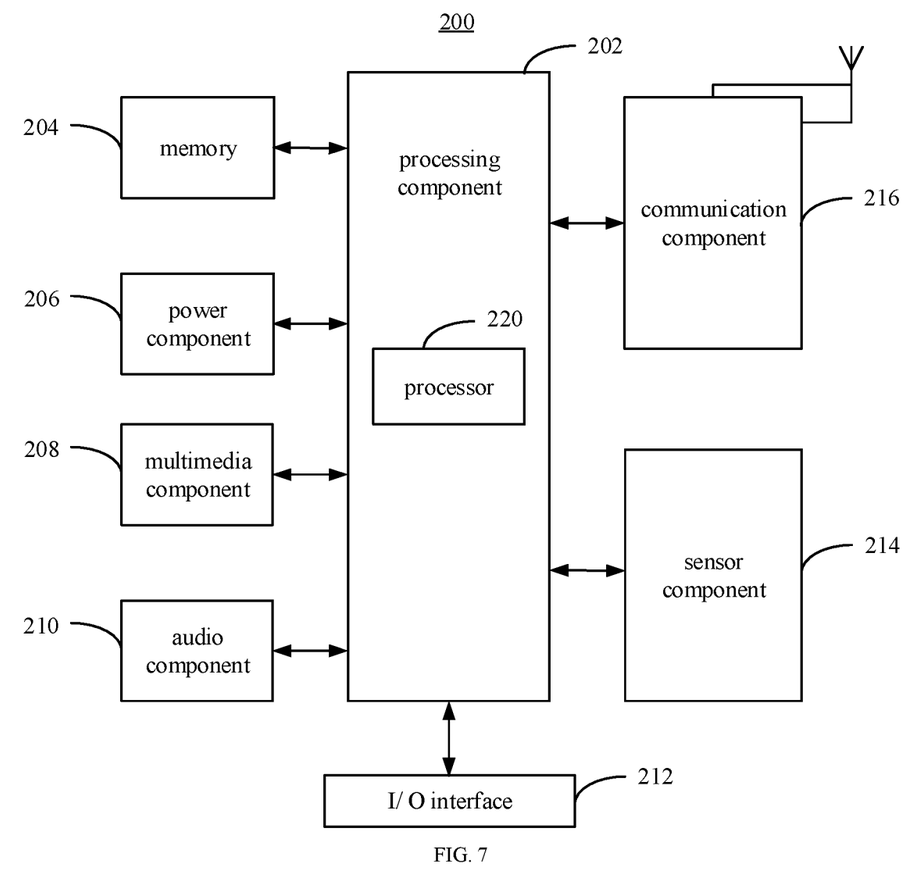
FIG. 7 shows a block diagram of another audio processing apparatus illustrated according to an example.

FIG. 7 shows a block diagram of another audio processing apparatus illustrated according to an example. For example, the audio processing apparatus 200 can be a cell phone, a computer, a digital broadcast terminal, a message sending and receiving device, a game console, a tablet device, a medical device, a fitness device, a personal digital assistant, etc.

Referring to FIG. 7, the audio processing apparatus 200 may include one or more of the following components: a processing component 202, a memory 204, a power component 206, a multimedia component 208, an audio component 210, an Input/Output (I/O) interface 212, a sensor component 214, and a communication component 216.

The processing component 202 generally controls overall operations of the audio processing apparatus 200, such as operations associated with display, telephone call, data communication, camera operation, and recording operation. The processing component 202 may include one or more processors 220 to execute instructions to complete all of or part of the steps of the above method. In addition, the processing component 202 may include one or more modules to facilitate the interaction between the processing component 202 and other components. For example, the processing component 202 may include a multimedia module to facilitate interaction between the multimedia component 208 and the processing component 202.

A memory 204 is configured to store various types of data to support operations of the audio processing apparatus 200. Examples of such data include instructions for any application or method operating on the audio processing apparatus 200, contact data, phonebook data, messages, pictures, videos, etc. The memory 204 may be implemented by any type of volatile or non-volatile storage device or a combination of them such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

A power component 206 provides power for various components of the audio processing apparatus 200. The power component 206 may include a power management system, one or more power supplies, and other components associated with generating, managing and distributing power for the audio processing apparatus 200.

The multimedia component 208 includes a screen providing an output interface between the audio processing apparatus 200 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some examples, the multimedia component 208 includes a front camera and/or a rear camera. When the audio processing apparatus 200 is in an operating mode, such as shooting mode or video mode, the front camera and/or rear camera can receive external multimedia data. Each front or rear camera may be a fixed optical lens system or have a focal length and optical zoom capability.

The audio component 210 is configured to output and/or input audio signals. For example, the audio component 210 includes a Microphone (MIC), and when the audio processing apparatus 200 is in an operation mode, such as a call mode, a recording mode and a voice recognition mode, the microphone is configured to receive external audio signals. The received audio signals may be further stored in the memory 204 or sent by the communication component 216. In some examples, the audio component 210 further includes a speaker for outputting audio signals.

The I/O interface 212 provides an interface between the processing component 202 and a peripheral interface module. The peripheral interface module may be a keyboard, a click wheel, a button, etc. The button may include but is not limited to a home button, a volume button, a start button and a lock button.

The sensor component 214 includes one or more sensors, used to provide state evaluation on various aspects for the audio processing apparatus 200. For example, the sensor component 214 may detect an open/closed state of the audio processing apparatus 200 and the relative positioning of a component, for example, the component is a display and keypad of the audio processing apparatus 200. The sensor component 214 may also detect a position change of the audio processing apparatus 200 or a component of the audio processing apparatus 200, the presence or absence of contact of the user with the audio processing apparatus 200, orientation or acceleration/deceleration of the audio processing apparatus 200 and a temperature change of the audio processing apparatus 200. The sensor component 214 may include a proximity sensor configured to detect the presence of nearby objects without any physical contact. The sensor component 214 may also include an optical sensor, such as a CMOS or CCD image sensor, for use in imaging applications. In some examples, the sensor component 214 may also include an acceleration sensor, a gyroscope sensor, a magnetic sensor, a pressure sensor or a temperature sensor.

The communication component 216 is configured to facilitate wired or wireless communication between the audio processing apparatus 200 and other devices. The audio processing apparatus 200 can access wireless networks based on communication standards such as WiFi, 2G or 3G, or a combination of them. In an example, the communication component 216 receives broadcast signals or broadcast associated information from an external broadcast management system via a broadcast channel. In one example, the communication component 216 further includes a near field communication (NFC) module to facilitate short range communication. For example, the NFC module may be implemented based on radio frequency identification (RFID) technology, infrared data association (IrDA) technology, ultra wide band (UWB) technology, Bluetooth (BT) technology, and other technologies.

In an example, the audio processing apparatus 200 may be implemented by one or more of Application Specific Integrated Circuit (ASIC), Digital Signal Processor (DSP), Digital Signal Processing Device (DSPD), Programmable Logic Device (PLD), Field Programmable Gate Array (FPGA), controller, microcontroller, microprocessor or other electronic components, and is used to execute any of the audio processing methods.

In the example, a non-transitory computer-readable storage medium including instructions is further provided, such as a memory 204 including instructions, and the instructions may be executed by the processor 220 of the audio processing apparatus 200 to accomplish the methods. For example, the non-temporary computer-readable storage medium may be an ROM, a random access memory (RAM), a CD-ROM, a magnetic tape, a floppy disk, an optical data storage device, etc.

Figure 8:
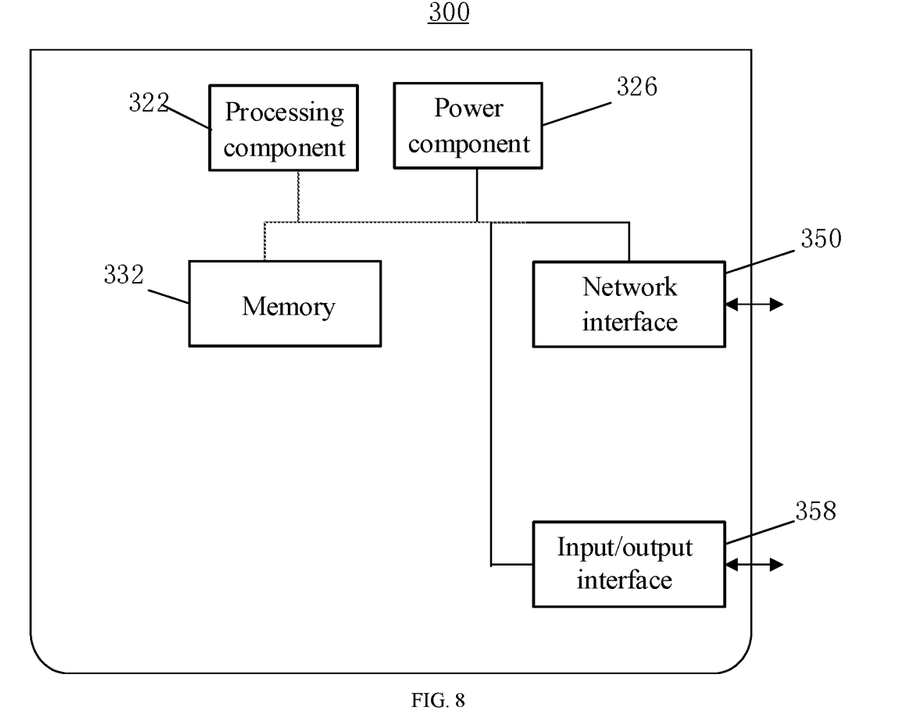
FIG. 8 shows a block diagram of a third audio processing apparatus illustrated according to an example.

FIG. 8 shows a block diagram of a third audio processing apparatus illustrated according to an example. For example, the audio processing apparatus 300 may be provided as a server. Referring to FIG. 8, the audio processing apparatus 300 includes a processing component 322, and further includes one or more processors, and a memory resource represented by the memory 332, used to store instructions which may be executed by the processing component 322, such as applications. The applications stored in the memory 332 may include one or more modules each corresponding to a set of instructions. In addition, the processing component 322 is configured to execute instructions, to execute any of the audio processing methods.

The audio processing apparatus 300 may also include a power supply component 326 configured to execute power supply management on the audio processing apparatus 300, a wired or wireless network interface 350 configured to connect the audio processing apparatus 300 to a network, and an input/output (I/O) interface 358. The audio processing apparatus 300 can operate an operating system stored in the memory 332, such as Windows Server™, Mac OS X™, Unix™, Linux™, FreeBSD™ or the like.

It can be further understood that "multiple" in the disclosure refers to two or more than two, and that other quantifiers are similar. "And/or", which describes the association relationship of associated objects, indicates that three relationships can exist, for example, A and/or B, which can indicate the following three cases: A alone, both A and B, and B alone. The character "/" generally indicates an "or" relationship between former and later associated objects. Singular forms "a", "said" and "the" are also intended to include most forms, unless the context clearly indicates otherwise.

It is further understood that terms "first", "second", etc. are used to describe a variety of information, but such information shall not be limited to these terms. These terms are used to distinguish the same type of information from one another and do not indicate a particular order or level of importance. In fact, expressions "first" and "second" can be used interchangeably. For example, without departing from the scope of the disclosure, the first information may also be referred to as second information, and similarly, the second information may also be referred to as first information.

It is further understood that unless otherwise specified, "connection" includes a direct connection between two without the presence of other components, as well as an indirect connection between the two with the presence of other components.

It is further understood that although the operations are depicted in a particular order in the drawings in examples of the disclosure, this shall not be construed as requiring that the operations be performed in a particular order shown or in serial order, or that all of the operations shown be performed to obtain desired results. In a specific environment, multitasking and parallel processing may be beneficial.

A person skilled in the art would readily conceive of other examples of the disclosure after considering the specification and practicing the invention disclosed herein. The present application is intended to cover any variations, uses or adaptive changes of the disclosure. These variations, uses or adaptive changes follow the general principle of the disclosure and include common general knowledge or conventional technical means in the technical field that are not disclosed in the disclosure. The specification and examples are considered exemplary, and the true scope and spirit of the disclosure are indicated by the following scope of rights.

It shall be understood that the disclosure is not limited to the precise structure described above and shown in the drawings, and various modifications and changes can be made without departing from its scope. The scope of the disclosure is limited by the scope of the appended rights.

What is claimed is:

1. An audio processing method, applied to a first terminal, the audio processing method comprising:
    in response to receiving of audio data that is input by a user at the first terminal, and determination that a voice change function is turned on, determining a change parameter; and
    based on the change parameter, performing change processing on the audio data;
    wherein the determining the change parameter comprises:
        in response to the voice change function being turned on earlier than a time when a voice path is created, setting the change parameter at the time when the voice path is created, or
        in response to the voice change function being turned on later than the time when the voice path is created, traversing a change parameter library to obtain the change parameter by matching the voice path to the change parameter.

2. The audio processing method according to claim 1, wherein the voice path is created by:
    turning on function options for setting voice change functions,
    adding applications corresponding to the voice path on a voice change function setting page corresponding to the function options, and
    setting the change parameter.

3. The audio processing method according to claim 2, wherein the function options comprise a game booster function.

4. The audio processing method according to claim 1, wherein the change parameter comprises a voice change function turn-on parameter, an application identification or a change mode; wherein
    based on the change parameter, the method further comprising performing change processing on the audio data, comprising:
    in response to the voice change function not being currently turned on, but the voice change function turn-on parameter being characterized that the voice change function is turned on and a change mode is set up, and that the application identification used by an application currently running is the same as the application identification of the change parameter, turning on a function of performing change processing on the audio data, and performing change processing on the audio data in the change mode; or
    in response to the voice change function being currently turned on, but the change mode corresponding to the change parameter is not accordant with a change mode used by an application currently running, switching to a function of performing change processing on the audio data in a change mode corresponding to the change parameter.

5. The audio processing method according to claim 4, wherein the audio processing method further comprises:
    in response to the voice change function being currently turned on, but the voice change function turn-on parameter being characterized that the voice change function is not turned on or that the application identification of an application currently running is different from the application identification of the change parameter, turning off the function of performing change processing on the audio data.

6. An audio processing apparatus, applied to a first terminal, wherein the audio processing apparatus comprises:
a memory that stores instructions; and
a processor that is communicatively coupled to memory,
wherein the instructions when executed by the processor cause the processor to:
in response to receiving of audio data that is input by a user at the first terminal, and a determination that a voice change function is turned on, determine a change parameter; and
based on the change parameter, perform change processing on the audio data;
wherein change parameter is determined by:
when the voice change function is turned on being earlier than a time when a voice path is created, setting the change parameter at the time when the voice path is created; or
when the voice change function is turned on being later than the time when the voice path is created, traversing a change parameter library to obtain the change parameter by matching the voice path to the change parameter.

7. The audio processing apparatus according to claim 6, wherein the voice path is created by:
turning on function options for setting voice change functions,
adding applications corresponding to the voice path on a voice change function setting page corresponding to the function options, and
setting the change parameter.

8. The audio processing apparatus according to claim 7, wherein the function options comprise a game booster function.

9. The audio processing apparatus according to claim 6, wherein the change parameter comprises a voice change function turn-on parameter, an application identification or a change mode;
wherein the instructions further cause the processor to:
in response to the voice change function not being currently turned on, but the voice change function turn-on parameter characterizes that the voice change function being turned on and a change mode being set up, and that the application identification used by an application currently running is the same as the application identification of the change parameter, turn on a function of performing change processing on the audio data, and perform change processing on the audio data in the change mode; or
in response to the voice change function being currently turned on, but the change mode corresponding to the change parameter not being accordant with a change mode used by an application currently running, switch to the function of performing change processing on the the audio data in a change mode corresponding to the change parameter.

10. The audio processing apparatus according to claim 9, wherein the instructions further cause the processor to:
in response to the voice change function being currently turned on, but the voice change function turn-on parameter characterizes that the voice change function not being turned on or that the application identification of an application currently running being different from the application identification of the change parameter, turn off the function of performing change processing on the audio data.

11. A non-transitory computer-readable storage medium, storing instructions, the instructions the instructions when executed by a processor to cause the processor to execute a method comprising:
in response to receiving of audio data that is input by a user at a first terminal, and determination that a voice change function is turned on, determining a change parameter; and
based on the change parameter, perform change processing on the audio data;
wherein the determining the change parameter comprises:
in response to the voice change function being turned on earlier than a time when a voice path is created, setting the change parameter at the time when the voice path is created, or
in response to the voice change function being turned on later than the time when the voice path is created, traversing a change parameter library to obtain the change parameter by matching the voice path to the change parameter.

12. The non-transitory computer-readable storage medium according to claim 11, wherein the voice path is created by:
turning on function options for setting voice change functions,
adding applications corresponding to the voice path on a voice change function setting page corresponding to the function options, and
setting the change parameter.

13. The non-transitory computer-readable storage medium according to claim 12, wherein the function options comprise a game booster function.

14. The non-transitory computer-readable storage medium according to claim 11, wherein the change parameter comprises a voice change function turn-on parameter, an application identification and a change mode;
wherein the method further comprises:
in response to the voice change function not being currently turned on, but the voice change function turn-on parameter being characterized that the voice change function is turned on and a change mode is set up, and the application identification used by an application currently running being the same as the application identification of the change parameter, turning on a function of performing change processing on the audio data, and performing change processing on the audio data in the change mode; or
in response to the voice change function being currently turned on, but the change mode corresponding to the change parameter not being accordant with a change mode used by an application currently running, switching to the function of performing change processing on the audio data in a change mode corresponding to the change parameter.

15. The non-transitory computer-readable storage medium according to claim 14, wherein the method further comprises:
in response to the voice change function being currently turned on, but the voice change function turn-on parameter being characterized that the voice change function is not turned on or that the application identification of an application currently running being different from the application identification of the change parameter, turning off the function of performing change processing on the audio data.

* * * * *

UNITED STATES PATENT AND TRADEMARK OFFICE
CERTIFICATE OF CORRECTION

PATENT NO. : 11,894,009 B2
APPLICATION NO. : 17/587243
DATED : February 6, 2024
INVENTOR(S) : Zhang et al.

It is certified that error appears in the above-identified patent and that said Letters Patent is hereby corrected as shown below:

On the Title Page

Item (56), under "OTHER PUBLICATIONS", in Column 2, Line 3, delete "Internet :" and insert -- Internet: --, therefor.

In the Drawings

In Fig. 7, Sheet 4 of 5, for Tag "212", in Line 1, delete "I/ O" and insert -- I/O --, therefor. (As shown on the attached drawing sheet)

In the Specification

In Column 1, Line 52, delete "to in" and insert -- in --, therefor.
In Column 11, Line 38, delete "erasable." and insert -- erasable --, therefor.

In the Claims

In Column 15, Lines 55-56, in Claim 9, delete "the the" and insert -- the --, therefor.
In Column 16, Line 2, in Claim 11, delete "the instructions the instructions" and insert -- the instructions --, therefor.

Signed and Sealed this
Twenty-fifth Day of June, 2024

Katherine Kelly Vidal
*Director of the United States Patent and Trademark Office*

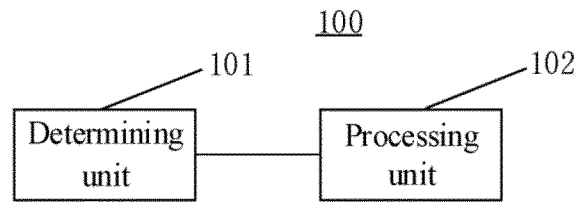
FIG. 6
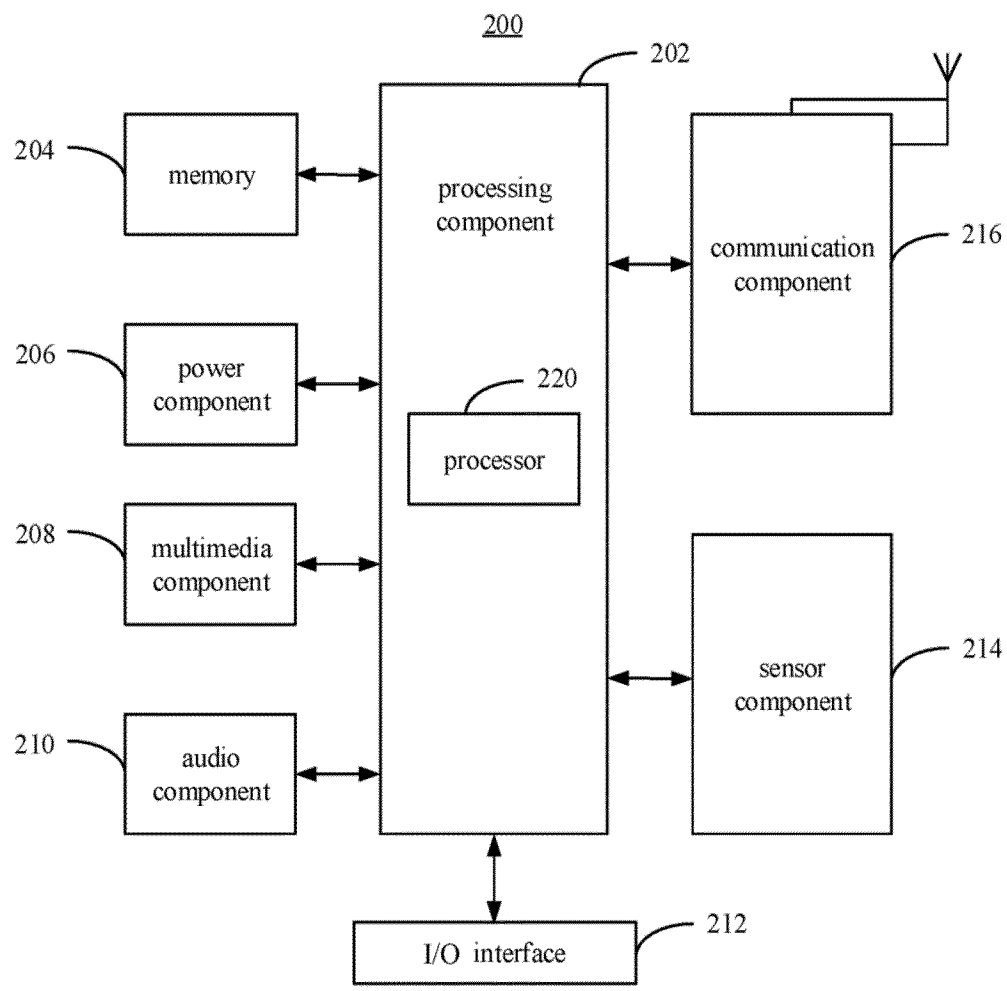
FIG. 7